(12) United States Patent
Scalora et al.

(10) Patent No.: US 7,665,027 B1
(45) Date of Patent: Feb. 16, 2010

(54) FINANCIAL RELATIONSHIP VISUALIZATION

(75) Inventors: Michael Amore Scalora, Orem, UT (US); David Audley Duncan, Orem, UT (US); Walter Holladay, Orem, UT (US)

(73) Assignee: Intuit Inc., Mountain View, CA (US)

( * ) Notice: Subject to any disclaimer, the term of this patent is extended or adjusted under 35 U.S.C. 154(b) by 454 days.

(21) Appl. No.: 11/698,490

(22) Filed: Jan. 25, 2007

(51) Int. Cl.
*G06F 3/00* (2006.01)
*G06F 3/14* (2006.01)
*G09G 5/00* (2006.01)

(52) U.S. Cl. .................. 715/765; 715/764; 715/200
(58) Field of Classification Search .......... 715/764, 715/765, 200, 212, 866; 705/1, 35
See application file for complete search history.

(56) References Cited

U.S. PATENT DOCUMENTS

| | | | |
|---|---|---|---|
| 2002/0033850 A1* | 3/2002 | Bates et al. | 345/853 |
| 2007/0179984 A1* | 8/2007 | Watanabe | 707/200 |
| 2008/0068401 A1* | 3/2008 | Albrecht et al. | 345/645 |
| 2008/0109762 A1* | 5/2008 | Hundal et al. | 715/855 |
| 2009/0031236 A1* | 1/2009 | Robertson et al. | 715/765 |

* cited by examiner

*Primary Examiner*—X. L Bautista
(74) *Attorney, Agent, or Firm*—Osha • Liang LLP

(57) ABSTRACT

A method for visualizing a financial relationship on a document involves displaying a first financial component and a second financial component, where the second financial component and the first financial component are related based on a predetermined relationship, generating a visualization associated with the predetermined relationship between the first financial component and the second financial component, and displaying the visualization on the document, where the visualization signifies the predetermined relationship between the first financial component and the second financial component.

28 Claims, 7 Drawing Sheets

Law Firm Balance Sheet Document 500

| 📋 Balance Sheet | | | Type a help question | Ask | ▼ How Do I? | _ □ ✕ |
|---|---|---|---|---|---|---|

[ Modify Report... ] [ Memorize... ] [ Print... ] [ E-mail ▼ ] [ Export... ] [ Hide Header ] [ Collapse ] [ Refresh ]

Dates [This Fiscal Year-to-date ▼]  As of [12/15/2007 ▦]  Columns [Total only ▼]  Sort By [Default ▼]

9:07 AM
12/15/07
Accrual Basis

Law Firm
Balance Sheet
As of December 15, 2007

◇    Dec 15, 07    ◇

ASSETS
  Current Assets
    Checking/Savings
      General Business Checking Acct.      39,210.80
      Client Trust Account
        Abraham J. Williams Trust    3,500.00
        Jake Thomas Trust      6,110.00
      Total Client Trust Account      9,610.00

Petty Cash Account      500.00
    Total Checking/Savings      49,320.80 ◀

Accounts Receivable
      Accounts Receivable      13,258.35
    Total Accounts Receivable      13,258.35 ◀    Visualization 510

Other Current Assets
      Prepaids
        Prepaid Insurance    625.00
      Total Prepaids      625.00

Total Other Current Assets      625.00 ◀

Total Current Assets      63,204.15

Fixed Assets
    Computer Equipment (Over $500)      2,500.00
    Accumulated Depreciation      -769.20
  Total Fixed Assets      1,730.80

TOTAL ASSETS    ▶    64,934.95 ◀

LIABILITIES & EQUITY
  Liabilities
    Current Liabilities
      Accounts Payable

FIGURE 5

Law Firm Balance Sheet
Document
600

| Balance Sheet | | | | Type a help question | Ask | ▼ How Do I? | _ □ X |

Modify Report... | Memorize... | Print... | E-mail ▼ | Export... | Hide Header | Collapse | Refresh
Dates | This Fiscal Year-to-date | As of 12/15/2007 | Columns | Total only | Sort By | Default 9:07 AM             Law Firm
12/15/07            Balance Sheet
Accrual Basis            As of December 15, 2007

Dec 15, 07

ASSETS
   Current Assets
      Checking/Savings
         General Business Checking Acct.      39,210.80
         Client Trust Account
            Abraham J. Williams Trust     3,500.00       Visualization
            Jake Thomas Trust     6,110.00         610
           Total Client Trust Account         9,610.00

Petty Cash Account              500.00
      Total Checking/Savings            49,320.80

Accounts Receivable
         Accounts Receivable            13,258.35
      Total Accounts Receivable        13,258.35

Other Current Assets
         Prepaids
            Prepaid Insurance     625.00
         Total Prepaids                625.00

Total Other Current Assets        625.00

Total Current Assets            63,204.15

Fixed Assets
      Computer Equipment (Over $500)     2,500.00
      Accumulated Depreciation       -769.20
   Total Fixed Assets              1,730.80

TOTAL ASSETS     ▶    64,934.95 ◀

LIABILITIES & EQUITY
   Liabilities
      Current Liabilities
         Accounts Payable

FIGURE 6

FINANCIAL RELATIONSHIP VISUALIZATION

BACKGROUND

Every year millions of financial documents are created for various purposes. The purpose of a financial document (i.e., any document that is related directly or indirectly to financial transactions) is usually to inform a reader about any financial matter relevant to the reader. Examples of financial documents include, but are not limited to, financial reports, budgets, tax reports, bank statements, credit card bills, policy reports, statistical reports, invoices, traffic tickets, inspection reports, appraisal reports, environmental reports, annual business reports, scientific reports, recommendation reports, and/or other types of reports.

Financial documents may include a multitude of components to help express the financial impact of a transaction, such as charts, tables, figures, pictures, fields, summaries, references, footnotes, and abstracts. Different components within a document are often related to each other and/or multiple other components.

For example, an invoice for computer repair includes a total amount owed, which is related to the cost of all the replacement parts used in the computer and the cost of labor for a technician to fix the computer. Certain times, a multitude of charges may not be included in the total amount owed such as when the charge is covered under warranty for the computer repair, waived, or part of a promotion.

In a second example, a budget sheet includes various expenses. Some of the expenses are associated with a project name while other expenses listed on the same budget sheet are associated with other project names or possibly no project names.

To determine how various components found on a financial document are related, a reader must review all the components (e.g., costs, expenses, total, project name, etc.) displayed in the document (e.g., invoice, budget sheet) and analyze each component based on information that may or may not be in the document to determine and understand the relationship to other components.

SUMMARY

In general, in one aspect, the invention relates to a method for visualizing a financial relationship on a document. The method comprises displaying a first financial component and a second financial component, where the second financial component and the first financial component are related based on a predetermined relationship, generating a visualization associated with the predetermined relationship between the first financial component and the second financial component, and displaying the visualization on the document, wherein the visualization signifies the predetermined relationship between the first financial component and the second financial component.

In general, in one aspect, the invention relates to a user interface for visualizing a financial relationship on a document. The user interface comprises a first financial component and a second financial component, where the second financial component and the first financial component are related based on a predetermined relationship, and a visualization on the document signifying the predetermined relationship between the first financial component and the second financial component.

In general, in one aspect, the invention relates to a computer readable medium comprising instructions for visualizing a financial relationship on a document. The instructions comprising functionality to display a first financial component and a second financial component, where the second financial component and the first financial component are related based on a predetermined relationship, generate a visualization associated with the predetermined relationship between the first financial component and the second financial component, and display the visualization on the document, wherein the visualization signifies the predetermined relationship between the first financial component and the second financial component.

Other aspects of the invention will be apparent from the following description and the appended claims.

BRIEF DESCRIPTION OF DRAWINGS

FIGS. 4-6 show exemplary screen shots in accordance with one or more embodiments of the invention.

DETAILED DESCRIPTION

Figure 1:
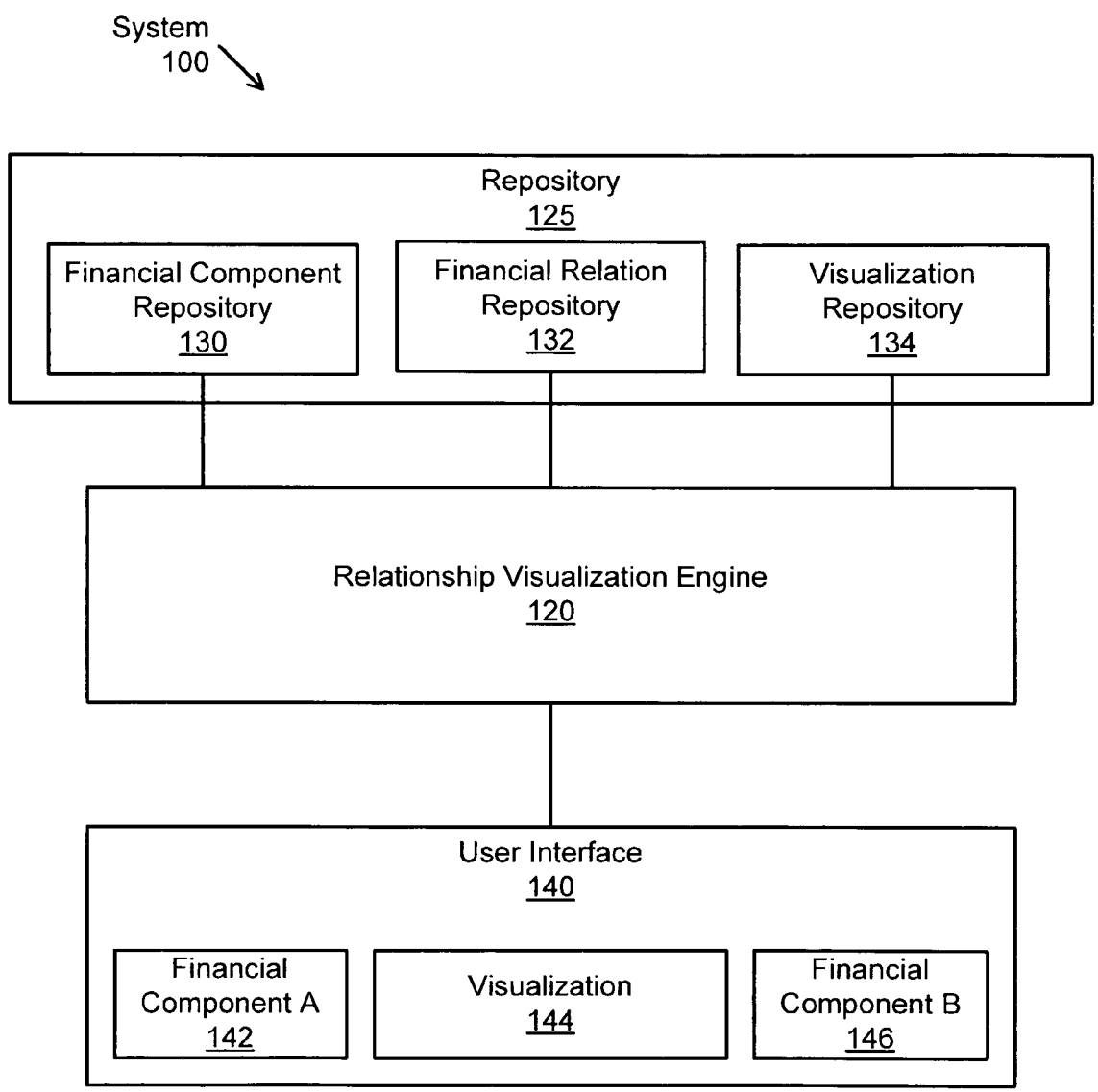
FIG. 1 shows a system for financial relationship visualization in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for visualizing financial relationships. Specifically, embodiments of the invention allow for displaying financial components, generating a visualization associated with a predetermined relationship between financial components and displaying the visualization to signify the predetermined relationship. Moreover, in one or more embodiments of the invention, visualizing financial relationships enable a user to comprehend the relation between different financial components.

FIG. 1 shows a system (100) in accordance with one or more embodiments of the invention. As shown in FIG. 1, the system (100) includes a relationship visualization engine (120), a repository (125), user interface (140), financial component A (142), visualization (144), and financial component B (146). The repository (125) may be general storage solution or may be distributed with various specialized repositories, such as financial component repository (130), financial relation repository (132), visualization repository (134).

A financial component repository (130) is a repository configured to store financial components. In one or more embodiments of the invention, a financial component corresponds to any component that is associated with a financial matter and/or transaction. The financial component may be directly or indirectly related to the financial matter and/or transaction. For example, a financial component may be a department store where a credit charge is shown in a credit card statement, a phone number and/or address of the store where the credit card was charged, or the description of the product purchased from the store.

In one or more embodiments of the invention, the financial component may be a text field, a graphical image, a table, a chart, a number, a description, a paragraph, or any other component related to a financial matter. Examples of financial components include total assets in a budget sheet, a checking account balance in a bank statement, a graph describing income trends, product purchases on a business expenses sheet, the type of tire bought shown on a bill for a tire, the accounts receivable on a business ledger, the car payment due on a monthly loan statement, and the car type associated with a car payment shown on a monthly loan statement.

Continuing with FIG. 1, the financial relation repository (132) is a repository configured to store information about financial component relationships. The financial component relation repository (132) may contain a relationship solution sheet that lists relations between different financial components. Further, the financial component relation repository (132) may contain information about financial components that can be used to determine a relation between different financial components.

In one or more embodiments of the invention, a financial component relationship corresponds to any relation between two or more financial components. The financial components may have a direct or indirect relation. In one or more embodiments of the invention, a financial component relationship is predetermined and includes a mathematical relation, an ownership relation, a product relation, or any other relation that may link two financial components.

For example, the first financial component may be a savings account associated with a user and the second financial component may be the total assets associated with the user. In this example, the first financial component is part of the calculation used to determine the second financial component. In a further example, three financial components may share a financial relationship. A first financial component (e.g., savings account) and a second financial component (e.g., real estate) may be totaled to calculate the third financial component (e.g., total assets). In this example, all three financial components are related and have a financial relationship. The first financial component and the second component are assets of the same user and therefore have a co-ownership relationship. The third financial component is a combination of the first and second financial component. Therefore, the third financial component has a mathematical relationship with the first financial component and a mathematical relationship with the second financial component.

Continuing with FIG. 1, the visualization repository (134) is a repository configured to store visualizations (144) used to signify financial relationships. In one or more embodiments of the invention, a visualization (144) of a financial component relationship corresponds to a visual representation of the relation between different financial components. A visualization (144) may be a symbol, lines, coloring, drawings, an animation, a video, a textual note, a graphical icon or any other visual indication of a relationship between two or more financial components. For example, a visualization may be an pointed arrow extended from a financial component corresponding to a "total" to a multitude of financial components. Another example involves highlighting two financial components with a similar color to indicate a relationship between the components. A further example may involve temporarily enlarging the size of financial components that are related. In one or more embodiments of the invention, the visualization may be printed, displayed, emailed, or presented in any other suitable manner.

In one or more embodiments of the invention, a visualization (144) of a financial component relationship may be generated dynamically after displaying the financial components and/or may be generated before displaying the financial components. The visualization (144) may be displayed by default and/or may be activated by a user. For example, when financial components are displayed, a visualization (144) of relations between financial components may be displayed by default. Another example may involve selecting particular visualizations (144) or groups of visualizations (144) for display from all possible visualizations (144) for relationships between financial components.

Continuing with FIG. 1, in one or more embodiments of the invention, a visualization (144) may indicate the type of predetermined relationship. Specifically, different visualizations (144) may represent different types of relationships. Visualizations (144) may be modified (e.g., differ by color, type, shape or any other visually distinct characteristic that can be used) to indicate different relationships and/or types of relationships. In one or more embodiments of the invention, different colors in a visualization (144) scheme may represent different types of relationships. For example, one visualization (144) may represent co-ownership of different bank accounts, one visualization (144) may indicate all loans on a net worth document, one visualization (144) may indicate all fees associated with the purchase of a tire including installation, disposal of an old tire, cost of a new tire etc., one visualization (144) may link a cause of damage with the expense incurred to fix the damage, one visualization (144) may link a cost incurred by a patient to the source of the cost and one visualization (144) may represent all overhead expenses in a business budget sheet.

The repository (125), financial component repository (130), financial relation repository (132), and the visualization repository (134) may be relational databases, flat files, or any other datastore well known in the art. New objects may be added to each repository, while existing objects within a repository may be modified or deleted.

Continuing with FIG. 1, in one or more embodiments of the invention, a relationship visualization engine (120) is configured to generate visualizations (144). The relationship visualization engine (120) may receive financial component information and determine the relationships between the components by accessing one or more of the repositories (e.g., repository (125), financial component repository (130), financial relation repository (132) and the visualization repository (134)). For example, the relationship visualization engine (120) may receive account information from multiple banks corresponding to the same social security number. The relationship visualization engine may determine a co-ownership relation between the two financial components.

In one or more embodiments of the invention, the relationship visualization engine (120) may also be used in conjunction with scraping technology. For example, the relationship visualization engine (120) may scan a web page, document, or an application for financial components. Thereafter, the relationship visualization engine (120) may determine whether any predetermined relationships exist between the various financial components.

In one or more embodiments of the invention, the relationship visualization engine (120) may use a solution sheet to determine the relationship between different financial components. A solution sheet may correspond to a table of financial components with information regarding the relations between different components. In such an embodiment, the relationship visualization engine (120) may have minimal analysis (if any) to conduct because the relation between different components is listed.

In one or more embodiments of the invention, the relationship visualization engine (120) may receive information regarding relationships between different financial components from a user. A user may indicate through the user interface (140) that two or more financial components are related. Furthermore, the user may also indicate the type of relationship two or more financial components share.

In one or more embodiments of the invention, the relationship visualization engine (120) generates a visualization (144) signifying the relationship between two or more financial components to be displayed in the user interface (140). The visualization (144) is essentially the same as describe above, contained in the visualization repository (134). The visualization (144) corresponding to relationships between the financial components may be received and/or obtained from the visualization repository (134) or may be submitted by a user. In one or more embodiments of the invention, the relationship visualization engine (120) generates sets of visualizations and/or visualization themes that can then be selected by the user. For example, a visualization theme may use different colors to represent different types of relationships, a visualization theme may use different shapes to represent different types of relationships, or a visualization (144) may use different sizes of financial components to indicate a relationship.

Continuing with FIG. 1, a user interface (140) is configured to provide a user with a graphical interface for viewing financial components (financial component A (142) & financial component B (146)) and a visualization (144) symbolizing relationships between different financial components. The user interface (140) may also be configured to receive information regarding financial components or relationships between financial components.

In one or more embodiments of the invention, a user interface (140) may be configured to allow a user to select different financial components, activate various visualizations (144), switch between visualization themes, and deactivate visualizations (144).

Figure 2:
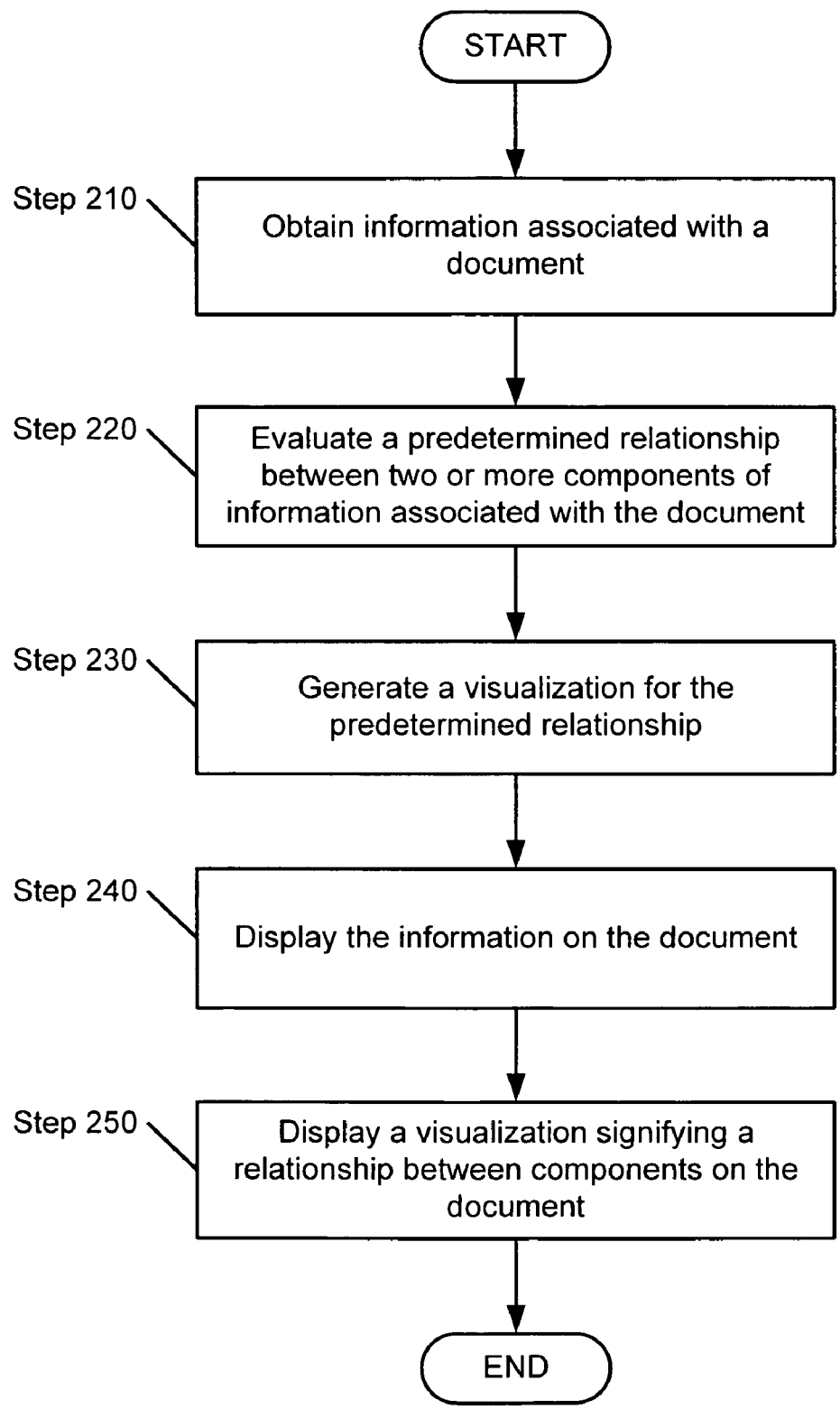
FIGS. 2-3 show flow diagrams in accordance with one or more embodiments of the invention.

FIG. 2 shows a flowchart for visualizing a relationship between different financial components in accordance with one or more embodiments of the invention. In Step 210, information associated with a document (e.g., a financial document, statement, invoice, payroll data) is obtained. Information may be obtained from any type of document, such as a file, website, network, application, or any suitable datastore. The information may also be obtained through scraping, scripts, user prompts, or any other suitable method of collecting information.

In Step 220, an evaluation is made to determine whether a predetermined relationship exists between two or more financial components. In one or more embodiments of the invention, the evaluation may be made dynamically at runtime using information regarding the financial components, may be made before hand, or may be made using a solution sheet that contains the relationships between different financial components. In one or more embodiments of the invention, when a financial component is selected by a user, an evaluation is made to determine all other financial components that have a predetermined relationship with the selected financial component.

In Step 230, a visualization is generated for the predetermined relationship. The visualization may be generated by default or after the visualization is activated by a user. Multiple visualizations may be generated at once and stored in a repository for later use or may be generated only when requested by a user. A set of visualizations may contain a common theme and/or may be generated simultaneously.

Continuing with FIG. 2, in Step 240, at least some of the information received is displayed on the document. The information may be displayed using any suitable interface. Examples of a suitable interface include but are not limited to a monitor, a kiosk, a cell phone, a pager, a laptop, a PDA, a television set, or a projector of some type. The information may also be displayed on physical documents using mediums such as paper, chalkboard, or dry erase board. Examples of documents include a bill, a budget, a financial review, a balance sheet, an expense sheet, an accounts receivable sheet, a warranty sheet, an invoice or any other physical or electronic document that may contain financial information. The information may be displayed in its original format or may be edited to be more conducive to displaying relationships between different pieces of information.

In Step 250, a visualization signifying a relationship between components on the document is displayed. The visualization may be generated by default to help a user comprehend the relationship between different components. In one or more embodiments of the invention, the visualization is only displayed when requested by a user. In one or more embodiments of the invention, a visualization disappears after a predetermined time period from activation. In one or more embodiments of the invention, the visualization is activated by hovering over the corresponding financial component. In one or more embodiments of the invention, a progression of visualizations may be used to signify relationships between financial components. For example, when a total figure on a budget is selected, a pointed arrow extending to all subtotals used to calculate the total figure may be shown. Thereafter, additional visualizations such as highlighting may indicate how each subtotal is calculated.

Figure 3:
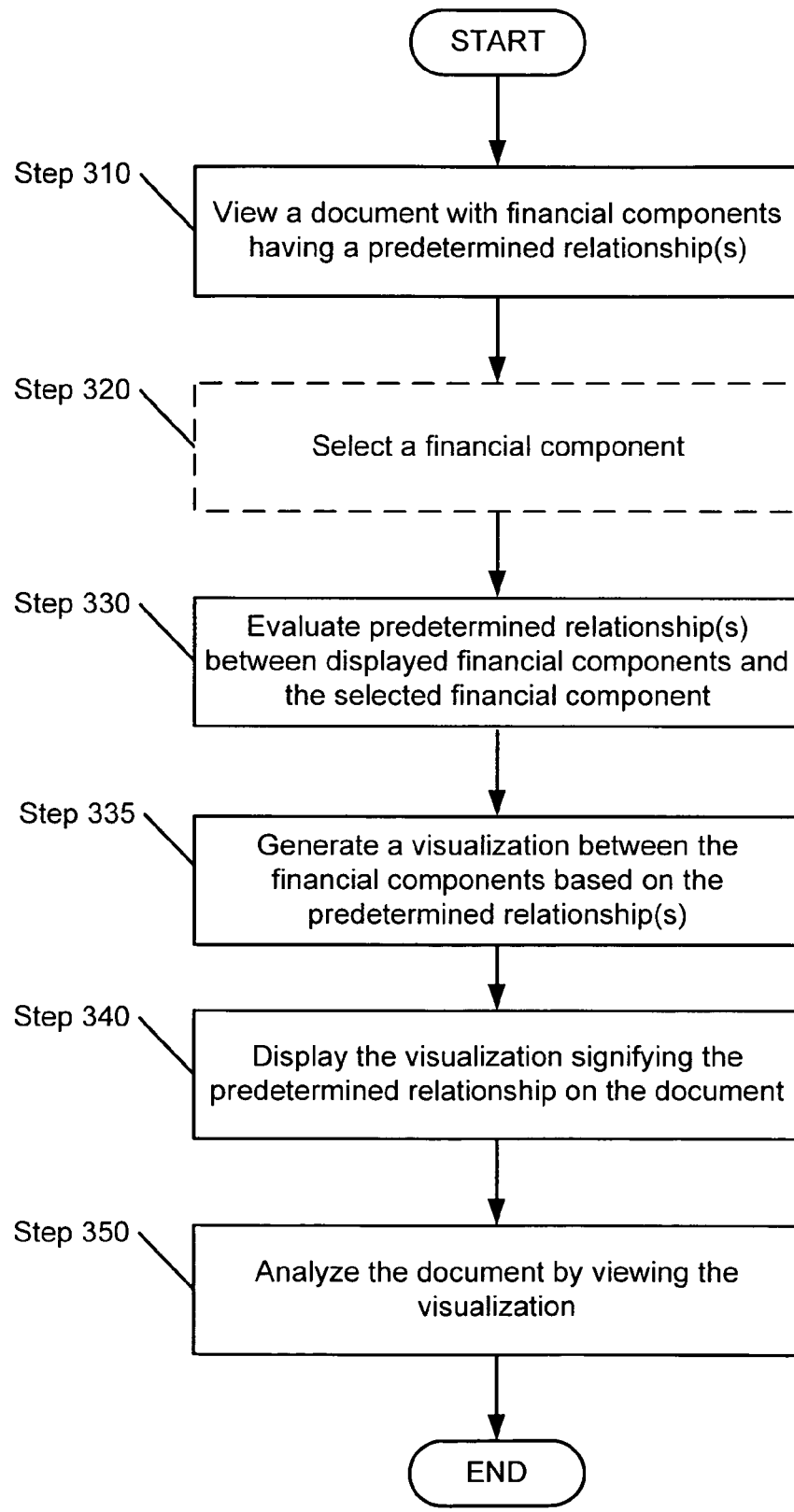

FIG. 3 shows a flow chart for comprehending the relationship between different financial components in accordance with one or more embodiments of the invention. In Step 310, a document with financial components having a predetermined relationship(s) are viewed (e.g., on a, computer screen, cell phone screen, or other display devices.

In Step 320, a financial component may be selected. In one or more embodiments, a user may select the financial component by clicking on the financial component, hovering over the financial component, selecting the financial component from a menu, touching the financial component on a touch screen, or by any other method that can be used to submit input to a system. In one or more embodiments of the invention, inaction by a user may result in a default selection for the user made by the system.

In Step 330, a predetermined relationship between all financial components and the selected financial component is evaluated. If the selected financial component has a predetermined relationship with one or more other financial components, a visualization is generated (Step 335).

Next, the visualization signifying the predetermined relationship is displayed on the document in Step 340. In one or more embodiments of the invention, if no predetermined relationship exists corresponding to the selected financial component, no visualization may be displayed by the system. However, in another embodiment of the invention, a notification including a lack of relationship may be displayed and/or an explanation of the selected financial component may be displayed.

Continuing with FIG. 3, in Step 350, the document is analyzed by viewing the visualization of the predetermined financial relationship between financial components. By viewing the visualization, the viewer is able to comprehend the financial components and the relation of the financial components to the other financial components displayed.

Figure 4:
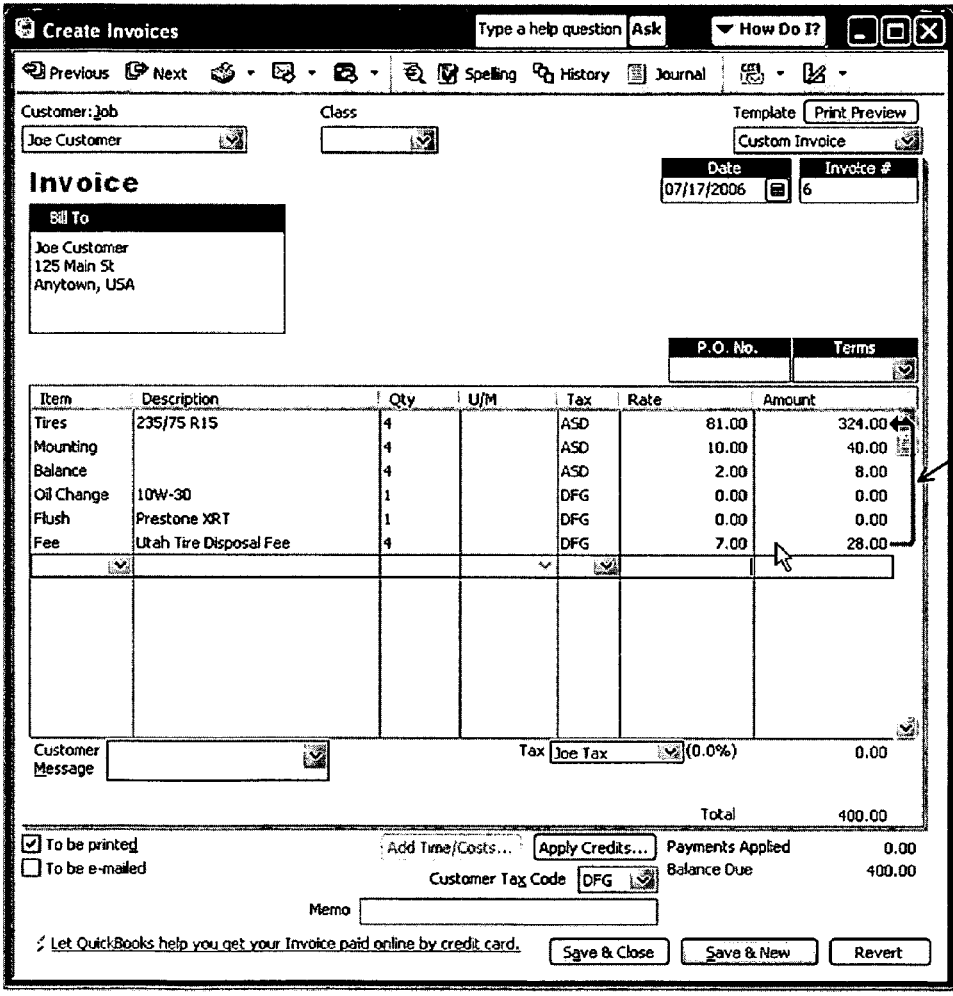

FIGS. 4-6 show examples in accordance with one or more embodiments of the invention that are in no way intended to limit the invention. FIG. 4 shows an example of an invoice document (410) in accordance with one or more embodiments of the invention. In FIG. 4, a user has selected the sixth row of the invoice corresponding to the "Utah Tire Disposal Fee" of $28.00. Selecting the row or a component in the row activates a visualization (410) in the form of a pointed arrow to the first row corresponding to "Tires" costing $324.00. The visualization may indicate to the user that the "Utah Tire Disposal Fee" is associated with the "Tires" costing $324.00. Another example may involve selecting the fifth row "flush," which may generate a visualization (not shown) representing a relationship to the "Oil Change" in the fifth row.

FIG. 5 shows an example of a Law Firm Balance Sheet document (500). In this example, the user has selected a dollar amount associated with the "Total Current Assets." In another embodiment of the invention, a user may directly select "Total Current Assets" to activate the visualization (510). The selection activates a visualization (510) corresponding to all values used to calculate the "Total Current Assets." These values include "Total Checking/Savings," "Total Accounts Receivable" and "Total Other Current Assets." This visualization (510) may help a user understand how the "Total Current Assets" are calculated.

FIG. 6 shows a continuation of the example shown in FIG. 5. For example, the user may now wish to know how the "Total Checking/Savings" on the Law Firm Balance Sheet document (600) is calculated. The user hovers over this row and is shown another visualization (610) similar to the one shown in FIG. 5, showing how the selected figure has been calculated. In this case, the "Total Checking/Savings" is shown to be calculated using the "General Business Checking Acct.," the "Total Client Trust Account," and the "Petty Cash Amount." Examples 5 and 6 show how a user can understand a law firm balance sheet without having general knowledge of a balance sheet or without knowing how the particular law firm calculates its finances.

Embodiments of the invention provide a visualization that signifies one or more relationships between financial components. Further, embodiments of the invention reduce the complexity of financial documents by providing a simplified method of understanding different components and their relations to one another.

Figure 7:
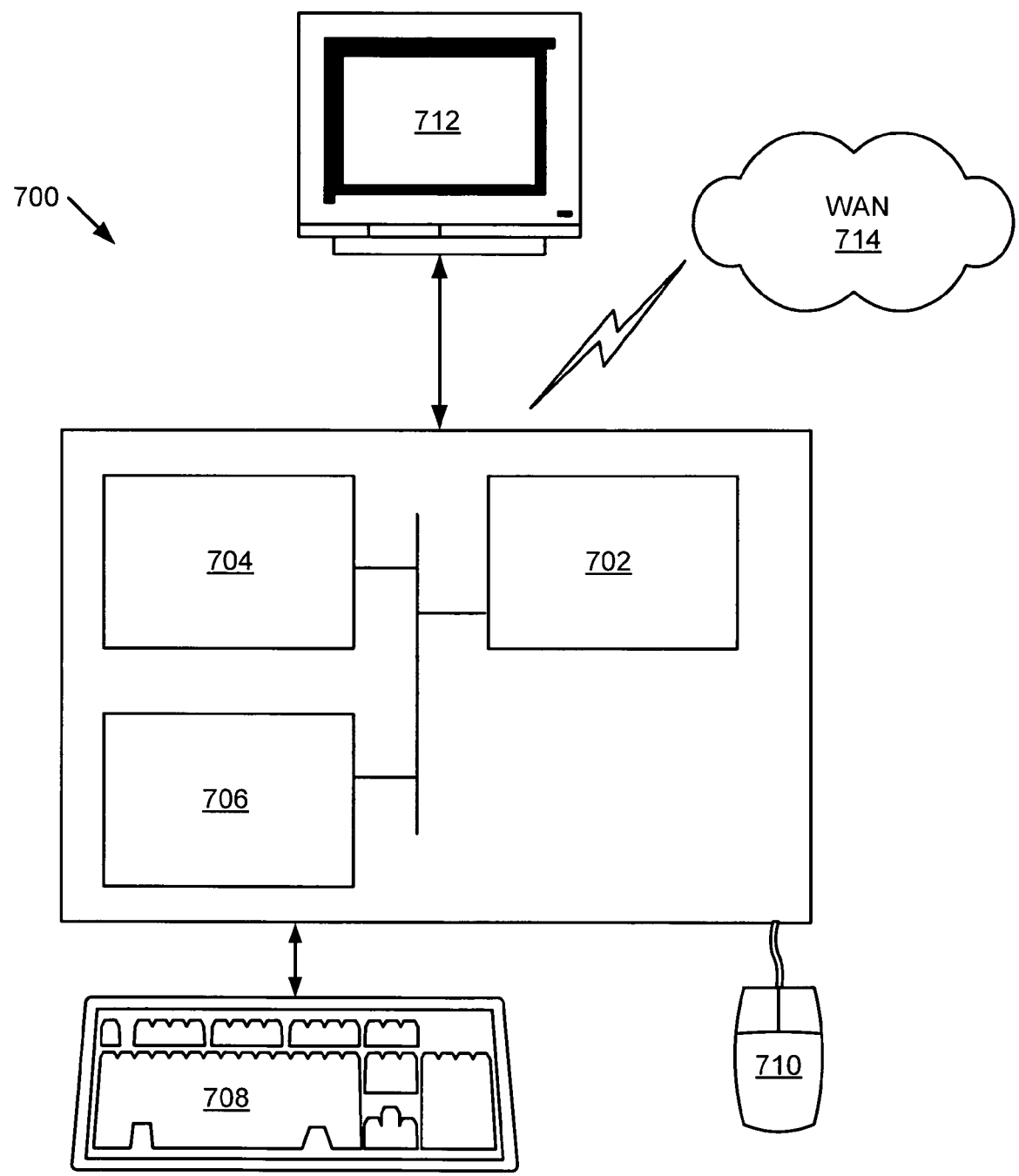
FIG. 7 shows a computer system in accordance with one or more embodiments of the invention.

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (714) via a network interface connection. Those skilled in the art will appreciate that these input and output means may take other forms, now known or later developed.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., relationship visualization engine, the user interface, the repository, etc.) may be located on a different node within the distributed system.

In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for visualizing a predetermined financial relationship on a financial document, comprising:
    displaying the financial document comprising a first financial component and a second financial component, wherein the second financial component and the first financial component are related based on the predetermined financial relationship;
    generating, using a processor a visualization associated with the predetermined financial relationship between the first financial component and the second financial component; and
    displaying, in response to a user selection of the first financial component, the visualization on the financial document signifying the predetermined financial relationship between the first financial component and the second financial component.

2. The method of claim 1, wherein the visualization is modified based on a type of the predetermined financial relationship.

3. The method of claim 1, wherein the visualization indicates a type of the predetermined financial relationship.

4. The method of claim 3, wherein the type of the predetermined financial relationship is identified by a color of the visualization.

5. The method of claim 1, wherein the user selection of the first financial component is executed by hovering a pointer over the first financial component.

6. The method of claim 1, wherein the visualization is an arrow indicator stretched between the first financial component and the second financial component.

7. The method of claim 1, wherein the visualization is a highlighting of the first financial component and the second financial component.

8. The method of claim 1, wherein the first financial component is a text field on the financial document.

9. The method of claim 1, wherein the first financial component is a graphical figure on the financial document.

10. A computer system comprising a processor and memory for implementing a user interface for visualizing a predetermined financial relationship on a financial document, the user interface comprising:
    a financial document comprising a first financial component and a second financial component, wherein the second financial component and the first financial component are related based on the predetermined financial relationship; and
    a visualization, displayed on the financial document, signifying the predetermined financial relationship between the first financial component and the second financial component, wherein the visualization is displayed in response to a user selection of the first financial component.

11. The computer system of claim 10, wherein the visualization is modified based on a type of the predetermined financial relationship.

12. The computer system of claim 10, wherein the visualization indicates a type of the predetermined financial relationship.

13. The computer system of claim 12, wherein the type of the predetermined financial relationship is identified by a color of the visualization.

14. The computer system of claim 10, wherein the visualization is an arrow indicator stretched between the first financial component and the second financial component.

15. The computer system of claim 10, wherein the visualization is a highlighting of the first financial component and the second financial component.

16. The computer system of claim 10, wherein the first financial component is a text field on the financial document.

17. The computer system of claim 10, wherein the first financial component is a graphical figure on the financial document.

18. The computer system of claim 10, further comprising a relationship visualization engine configured to:

evaluate the predetermined relationship between the first financial component and the second financial component; and generate the visualization signifying the predetermined relationship between the first financial component and the second financial component.

19. The computer system user interface of claim 10, wherein the user selection of the first financial component is executed by hovering a pointer over the first financial component.

20. A computer readable medium storing instructions embodied therein for execution on a computer system to perform a method for visualizing a predetermined financial relationship on a financial document, the method comprising:

displaying the financial document comprising a first financial component and a second financial component, wherein the second financial component and the first financial component are related based on the predetermined financial relationship;

generating a visualization associated with the predetermined financial relationship between the first financial component and the second financial component; and displaying in response to a user selection of the first financial component the visualization on the financial document signifying the predetermined financial relationship between the first financial component and the second financial component.

21. The computer readable medium of claim 20, wherein the visualization is modified based on a type of the predetermined financial relationship.

22. The computer readable medium of claim 20, wherein the visualization indicates a type of the predetermined financial relationship.

23. The computer readable medium of claim 22, wherein the type of the predetermined financial relationship is identified by a color of the visualization.

24. The computer readable medium of claim 20, wherein the user selection of the first financial component is executed by hovering a pointer over the first financial component.

25. The computer readable medium of claim 20, wherein the visualization is an arrow indicator stretched between the first financial component and the second financial component.

26. The computer readable medium of claim 20, wherein the visualization is a highlighting of the first financial component and the second financial component.

27. The computer readable medium of claim 20, wherein the first financial component is a text field on the financial document.

28. The computer readable medium of claim 20, wherein the first financial component is a graphical figure on the financial document.

* * * * *

UNITED STATES PATENT AND TRADEMARK OFFICE
CERTIFICATE OF CORRECTION

| | |
|---|---|
| PATENT NO. | : 7,665,027 B1 |
| APPLICATION NO. | : 11/698490 |
| DATED | : February 16, 2010 |
| INVENTOR(S) | : Michael Amore Scalora et al. |

Page 1 of 1

It is certified that error appears in the above-identified patent and that said Letters Patent is hereby corrected as shown below:

In Claim 19, Column 9 (line 32), please delete --user interface--.

Signed and Sealed this

Sixth Day of April, 2010

David J. Kappos
*Director of the United States Patent and Trademark Office*